US006788430B1

(12) United States Patent  
Emoto

(10) Patent No.: US 6,788,430 B1
(45) Date of Patent: Sep. 7, 2004

(54) PRINTER, PRINTER CONTROL METHOD AND RECORDING MEDIUM STORING ITS PROCESS

(75) Inventor: Takahiro Emoto, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 829 days.

(21) Appl. No.: 09/610,331

(22) Filed: Jul. 5, 2000

(30) Foreign Application Priority Data

Jul. 12, 1999 (JP) .......................................... 11-198142

(51) Int. Cl.[7] .............................................. G06F 12/00
(52) U.S. Cl. ......................... 358/1.16; 399/82; 399/83; 399/383; 399/403
(58) Field of Search ................................ 358/1.1, 1.11, 358/1.13, 1.15, 1.16, 1.19, 296; 399/309, 364, 374, 404, 410, 82, 83, 43, 383, 403; 355/23, 24

(56) References Cited

U.S. PATENT DOCUMENTS

| | | | | |
|---|---|---|---|---|
| 4,992,958 A | * | 2/1991 | Kageyama et al. | ........ 358/1.17 |
| 5,731,879 A | | 3/1998 | Maniwa et al. | |
| 5,867,632 A | * | 2/1999 | Andree et al. | ................ 358/1.9 |
| 5,970,222 A | * | 10/1999 | Gusmano et al. | .......... 358/1.16 |
| 6,115,132 A | * | 9/2000 | Nakatsuma et al. | ....... 358/1.14 |
| 6,317,193 B2 | * | 11/2001 | Funahashi | ..................... 355/40 |
| 6,407,820 B1 | * | 6/2002 | Hansen et al. | ............. 358/1.12 |
| 6,466,328 B1 | * | 10/2002 | Bradley et al. | ............ 358/1.15 |
| 6,483,604 B1 | * | 11/2002 | Gerstenberger | ............ 358/1.17 |
| 6,515,758 B2 | * | 2/2003 | Uda et al. | ................... 358/1.15 |
| 6,606,165 B1 | * | 8/2003 | Barry et al. | .................. 358/1.9 |
| 6,614,542 B1 | * | 9/2003 | Salgado et al. | ............ 358/1.12 |
| 6,615,346 B1 | * | 9/2003 | Kawamoto | ................... 713/100 |

FOREIGN PATENT DOCUMENTS

| | | |
|---|---|---|
| EP | 0 782 067 A2 | 7/1997 |
| EP | 0 820 032 A2 | 1/1998 |

* cited by examiner

*Primary Examiner*—Edward Coles
*Assistant Examiner*—Alan Rahimi
(74) *Attorney, Agent, or Firm*—Sughrue Mion, PLLC

(57) ABSTRACT

A print request managing task (61) for managing a print request is placed between a language interpreting task (60) and a print execution task (63). Upon receipt of a print request (PREQ) from the language interpreting task (60), if it requests collate printing, for the printing process of the first copy, the print request managing task 61 generates a print data (PDAT) changed in the number of copies into 1 and transmits it to a print execution task (63) for the first copy. Then, after receiving a print end report from the print execution task 63, the print request managing task 61 stores data necessary for printing the second copy, et seq. as a storage data (SDAT)in a hard disc (39). For the printing process of the second copy, et seq., the print request managing task (61) read out the storage data (SDAT) stored in the hard disk (39), and transmits a print data (PDAT) generated from the storage data (SDAT) to the print execution task (63). As a result, efficient collate printing can be realized by using a hard disc.

15 Claims, 6 Drawing Sheets

PRINTER, PRINTER CONTROL METHOD AND RECORDING MEDIUM STORING ITS PROCESS

BACKGROUND OF THE INVENTION

1. Field of the Invention

This invention relates to a printer, printer control method and recording medium storing its process, and more particularly to a printer capable of collate printing, a printer control method for collate printing, and recording medium storing a process therefor.

2. Description of the Related Art

Some of printers like page printers, for example, are capable of collate printing. Collating printing is also called gathering printing, and it is the function of printing a plurality of copies by aligning the page numbers.

As another printing method for executing similar jobs, there is copy printing as well. Copy printing is also called stack printing, and it is the function of continuously printing a plurality of copies of every page.

For explaining them more concretely, let an example be taken in which two copies of a printed matter including the first page, second page and third page, i.e. three pages in total, are printed. In collate printing, pages are printed in the order of the printed matter of the first page, second page and third page, and another printed matter of the first page, second page and third page are printed. That is, two copies of sequentially aligned pages are printed.

In copy printing, printing is conducted in the order of the first page, first page, second page, second page, third page and third page. Therefore, printing is conducted by copy printing, a user must divide the printed sheets into blocks of the same pages and thereafter can obtain two copies of the printed matter. Therefore, collate printing is more convenient than copy printing for users.

However, printers for collate printing must hold data of all pages to be printed until printing of all copies is finished. If a memory is used to hold the data for printing, a memory of a large capacity is required. However, mounting a large amount of expensive memory devices are mounted in a printer is not desirable because it increases the cost. Therefore, printers incorporating a hard disc instead of a memory have been proposed.

In the case where a printer includes a hard disc, when the printer receives data to be printed, it once writes all of the data in the hard disc, and executes printing by using data written in the hard disc. Therefore, only if the hard disc has an enough capacity, collate printing can be conducted with no limitation about the number of pages. Additionally, since collate printing is possible regardless of the capacity of the memory, also with printers originally having a memory with a small capacity, collate printing is enabled by introducing a hard disc. Therefore, data stored in the hard disc is maintained in the printer until the printing job is completed.

Further, even when a memory of a large capacity is mounted in a printer, there is the possibility the printer program occupies the memory, and it may fails to print out complicated graphics and materials of a lot of pages. Furthermore, some types of printers cannot afford to add any further memory. In these cases, by sending data of a necessary number of copies to be printed from a computer to the printer for each number of copy, collate printing was realized. However, since the data to be printed was sent from the computer to the printer from the first copy to the second coy and to the third copy, the computer was not released from the job for an extremely long time. For example, when ten copies of a 5-page material are printed, a task for 50 pages was necessary. This kind of problem will be solved by mounting a hard disc to a printer and realizing collate printing of a necessary number of copies.

However, in the case of conducting collate printing with a printer having a hard disc, when the printer received print data of the first copy, it once stored the print data and thereafter transmit the print data to a printer engine. That is, since it started printing after storing the print data in the hard disc, it took a surplus time until completing the print of the first copy. There was also the problem that it takes the surplus time until the first page of the print is executed.

SUMMARY OF THE INVENTION

It is therefore an object of the invention to provide a printer which requires a time as short as possible until completing a printing job either upon one-copy printing or upon collate printing. It is a further object of the invention to provide a printer which need a time as short as possible until the first page of the print is executed.

To attain the objects, in a printer according to the invention, there is provided a print request managing task for managing: receiving a print request; generating and transmitting a print data according to the print request to efficiently conduct collate printing based on the contents of the print request; storing data necessary for printing based on the print request as a storage data in an auxiliary storage device; and generating and transmitting a print data from the storage data stored in the auxiliary storage device. Since the print request received from a language interpreting task is already interpreted, the print request managing task can know how to manage these three acts for executing efficient collate printing.

In this case, by giving a high priority to the print request managing task for the use of a central processing unit than the priority give to the language interpreting task for using the central processing unit, it is possible to prevent that the language interpreting task interrupts during execution of the print request managing task and the interpreted language by the printer is changed thereby.

By giving a lower priority to the print request managing task for the use of the central processing unit than the priority given to a print execution task or a communication task for using the central processing unit, data reception can be preferentially done, and the central processing unit can be allocated to the print execution task or the communication task even during execution of a print request managing task requiring a relatively long processing time.

In the case where the print request received from the language interpreting task requests collate printing of a plurality of copies, the print request managing task can quickly execute printing of the first copy of collate printing by generating a print data changed in number of copies into 1 for the first copy and transmit it to the print execution task, storing a data necessary for printing the second copy, et seq. as a storage data after receiving a print end report from the print execution task, reading the storage data stored in the auxiliary storage device for the second copy, et seq., and transmitting a print data generated on the basis of the storage data to the print execution task.

In this case, the print execution task may transmit a print end report to the print request managing task when printing of the print data received from the print request managing task is completed.

Further, if the print request managing task is configured to generate the storage data by compressing the print data, and storing this storage data in the auxiliary storage device, the data amount to be stored in the auxiliary storage device can be reduced.

If the print request managing task is configured to personally issue a print request when the number of printed copies does not reach the requested number of copies, it is possible to minimize influences of a change of the program to tasks other than the print request managing task.

If the print request managing task is configured to request an area of memory necessary for execution of printing of the second copy, et seq. to a memory managing task to reserve it, memory control is facilitated as well.

In the case where the language interpreting task issues the print request for each page, the print request managing task generates the print data and the storage data for each page, and the print execution task executes printing and transmits the print end report for each page, and sequentially delete data from the storage data stored in the auxiliary storage device by page to page when printing of such page of the final copy is finished, the occupied region in the auxiliary storage device can be released earlier.

The printer according to the invention is characterized in having the language interpreting task for interpreting a received data to be printed and transmitting a print request; the print request managing task for managing the print request received from the language interpreting task, storing the print request in the auxiliary storage device and use it, when necessary, and generating a print data for execution of printing with the printer engine in accordance with the print request; and the print execution task for receiving the print data from the print request managing task and driving the printer engine to execute printing in accordance with the print data. Since the print request managing task is provided at a latter stage of the language interpreting task, the print request managing task can use the auxiliary storage device only when it judges it necessary from the contents of the print request.

In this case, if the print request managing task is configured to determine based on the requested number of copies to be printed whether the auxiliary storage device should be used or not, or configured to use the auxiliary storage device only when the requested number of copies to be printed is 2 or more, efficient collate printing is possible.

Further, when the print request managing task is configured to call out a storage module for storing data in the auxiliary storage device when data should be stored therein and call out a read module for reading data from the auxiliary storage device when data should be read out from the auxiliary storage device, the program can be composed of modules.

Additionally, the invention can be realized as a control method of a printer. Furthermore, it is possible to realize the invention by recording a program for controlling the printer in this manner on a recording medium and have the printer read the program stored in the recording medium to execute printing.

DETAILED DESCRIPTION OF THE PREFERRED EMBODIMENTS

A printer according to the invention has a print request managing task provided between a language interpreting task and a print execution task to manage each print request. Even collate printing, for printing the first copy, the print request managing task transmits a print data to the print execution task not through a hard disc, and upon completion of the printing by the print execution task, it stores the data necessary for printing the second copy, et seq. as a storage data in the hard disc. Upon printing the second copy, et seq. by collate printing, the print request managing task read the storage data from the hard disc, then generates a print data based on the storage data and transmits it to the print execution task, thereby to execute the printing. In this manner, collate printing can be realized by using the hard disc, and printing of the first copy is completed quickly. More detailed explanation is made below.

Figure 1:
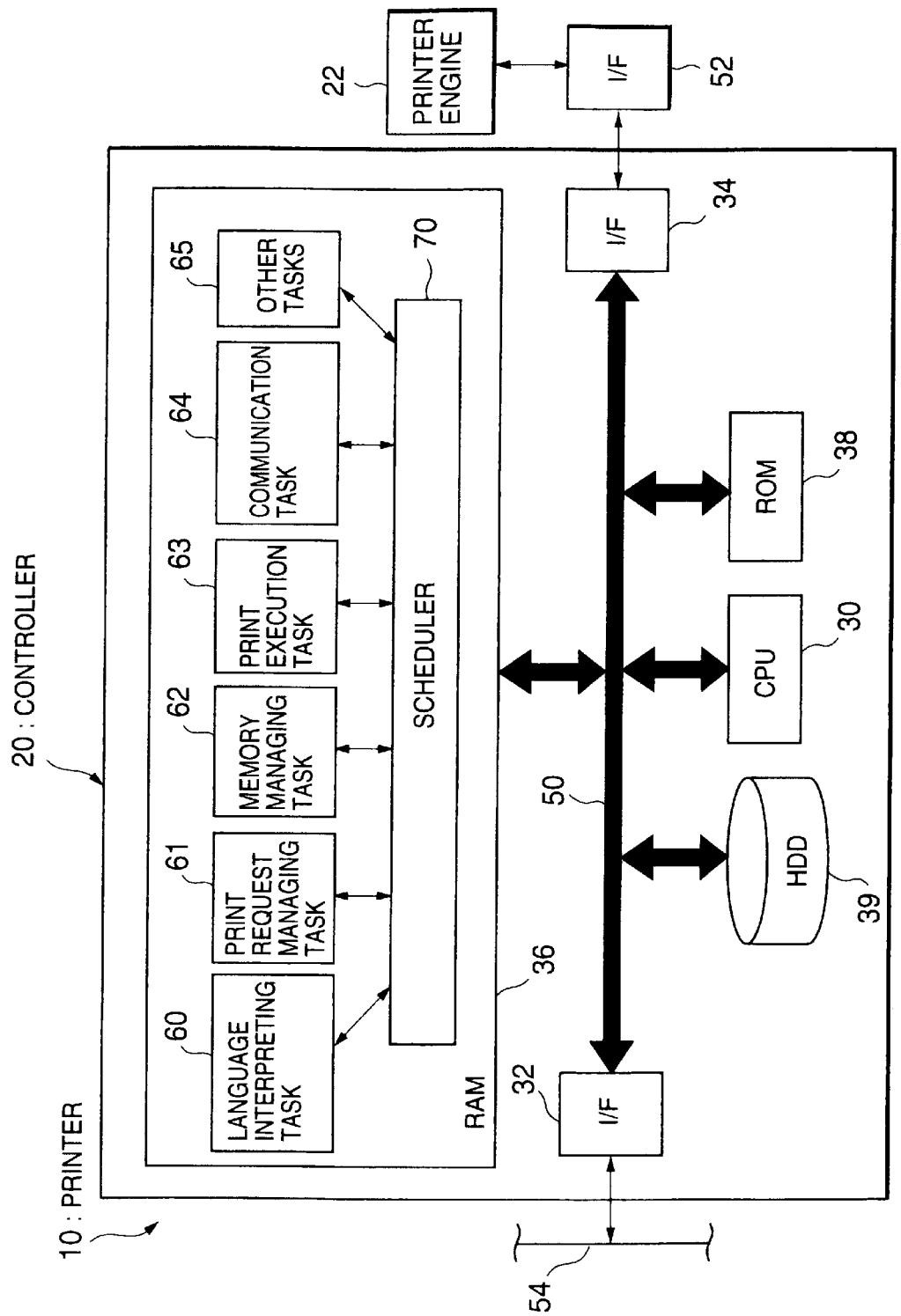
FIG. 1 is a diagram showing a hardware configuration of a printer according to the first embodiment of the invention.

First with reference to FIG. 1, general configuration of the printer according to an embodiment of the invention is explained. FIG. 1 is a block diagram showing general configuration of the printer according to this embodiment. As shown in FIG. 1, the printer 10 includes a controller 20 and a printer engine 22 as its major components. In this embodiment, the printer 10 is a page printer of a laser printing type.

The controller 20 includes CPU 30, interfaces 32, 34, RAM (random access memory) 36, ROM (read only memory) 38, and hard disc 39. These CPU 30, interfaces 32, 34, RAM 36, ROM 38 and hard disc 39 are connected to each other via a bus 50. Additionally, the controller 20 is connected to the printer engine 22 via the interface 34 and the interface 52. The hard disc 39 constitute an auxiliary storage device in this embodiment.

CPU 30 exchanges data with an external network 54 such as LAN (local area network) through the interface 32, and exchanges data with the printer engine 22 through the interfaces 34 and 52. This CPU 30 constituted a central processor in this embodiment.

CPU 30 exclusively executes one of a plurality of "tasks" (also called "processes") stored in RAM 36. In this embodiment, CPU 30 exclusively selects and executes tasks such as language interpreting task 60, print request managing task 61, memory managing task 62, print execution task 63, communication task 64 and other tasks 65. In addition to these representative tasks, there are other tasks in CPU 30. As these other tasks, there are idle task for executing an idling status of the printer, for example, and so on.

Changeover of tasks, i.e. management which task should be allocated the CPU 30 is performed by a scheduler 70. The scheduler 70 is a part of the program stored in RAM 36, and it is executed by CPU 30. The scheduler 70 has a priority table which stores priorities of individual tasks, and a priority changing portion for changing priorities of these tasks. The scheduler 70 allocates one of tasks to the COU 30 according to the priorities stored in the priority table.

A main function of the controller 20 having the above-explained configuration is to receive data to be printed from the network 54 and convert this data for printing into a print data of a structure that can be printed by the printer engine 33. This print data is transferred to the printer engine 22 through the interfaces 34 and 52, and the printer engine 22 executes printing.

Figure 2:
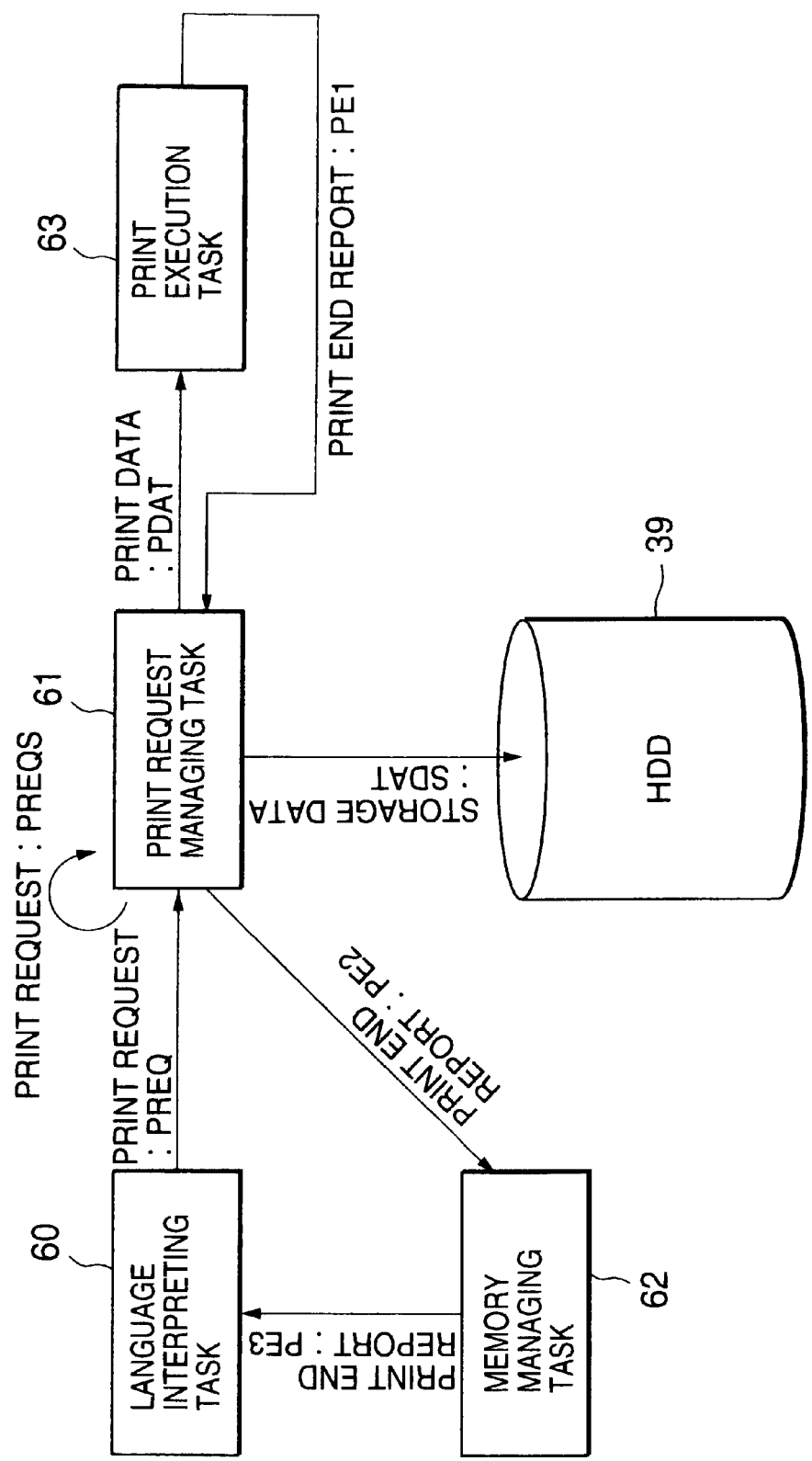
FIG. 2 is a diagram which illustrates a printing process of the first copy upon collate printing by the printer shown in FIG. 1.
Figure 3:
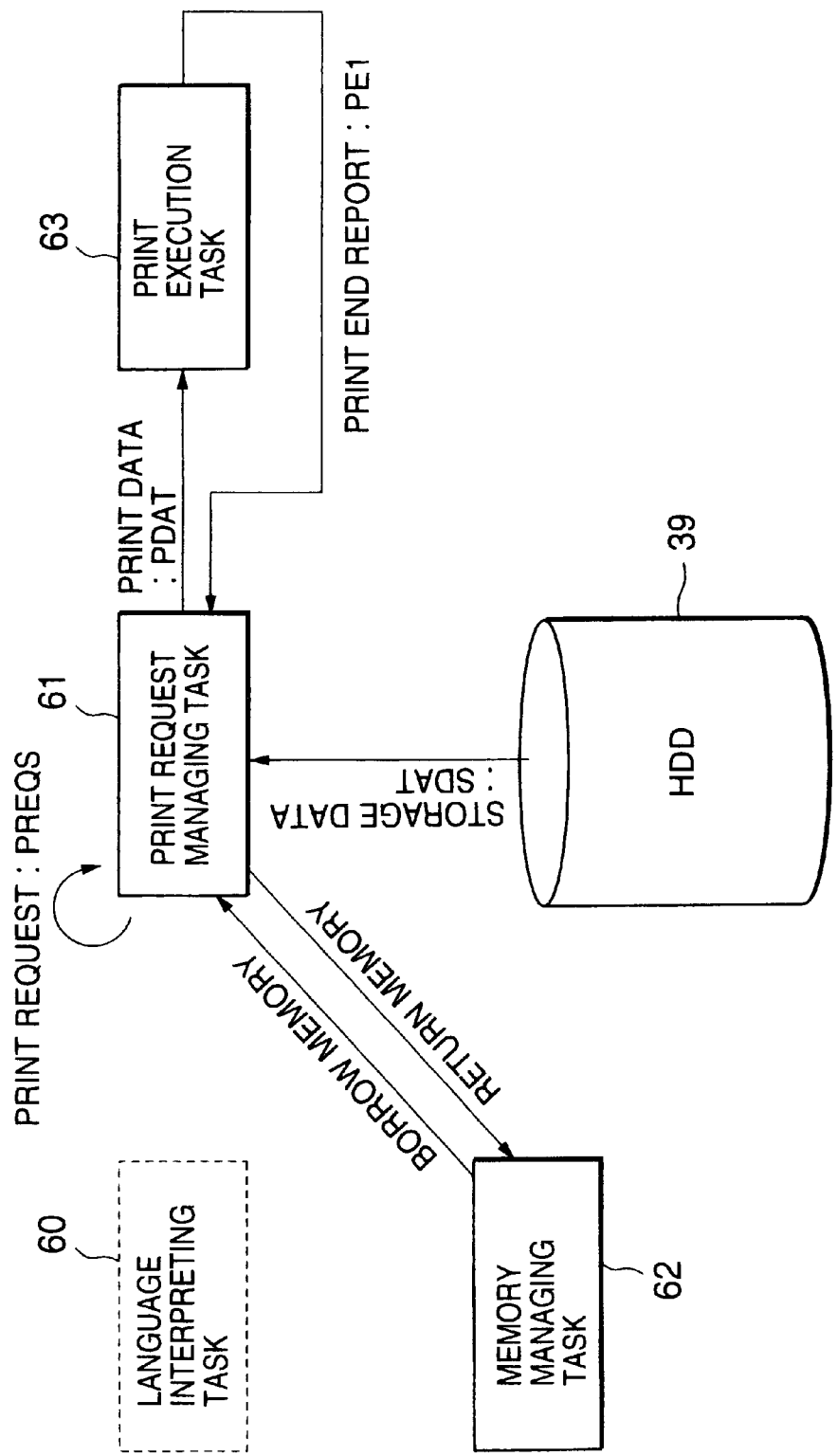
FIG. 3 is a diagram which illustrates a printing process of the second copy, et seq. for collate printing by the printer shown in FIG. 1.

Next referring to FIGS. 2 and 3, explanation is made about processing for printing the first copy and processing for printing the second copy, et seq. by collate printing. FIG. 2 is a block diagram for explaining processing for printing the first copy by collate printing, and FIG. 3 is a block diagram for explaining processing for printing the second copy, et seq. by collate printing.

As shown in FIG. 2, when the printer 10 receives data for printing the first copy of a plurality of copies to be printed by collate printing, the language interpreting task 60 analyzes the received data to be printed, and generates a print request structure. The print request structure is created by page to page, and contains the sheet size, number of copies of each page, indication of the front or back surface of the sheet, and intermediate code data indicating the contents of the page.

The reason why the intermediate code data is used as the contents of the page lies in reducing the amount of memory used. For example, if the data to be printed from the computer is character codes, it is necessary for printing the characters to read font data corresponding to the character codes and add necessary processing, and convert them into a final image data for a print output. Therefore, in order to print a certain page, bit image data of all characters forming the page may be created, but if a bit image data of the entire page is created, a large amount of memory is consumed. Therefore, the language interpreting task 60 is configured to hold the contents of the page in form of intermediate codes instead of holding the bit image data itself. The print request structure containing the intermediate code created in this manner is transmitted as a print request PREQ from page to page from the language interpreting task 60 to the print request managing task 61.

The print request managing task 61 having received the print request PREQ changes a part of the print request structure indicating the number of copies into 1. That is, even upon collate printing of five copies, the print request managing task 61 changes the number of copies into one copy. Then, based on the print request PREQ, it creates a print data PDAT, and transmits it to the print execution task 63. Since the number of copies is indicated as one copy, the print execution task 63 drives the printer engine 22 (see FIG. 1) according to the print data PDAT, and executes printing of only one copy. Upon execution of this printing, a bit image data is created according to the intermediate code data contained in the print request and written in an image buffer, and the print execution task 63 executes printing.

When the printing of the page according to the print data PDAT is finished, the print execution task 63 transmits a print end report PE1 to the print request managing task 61. In receipt of the print end report PE1, the print request managing task 61 stores the contents of the print request structure contained in the print request PREQ as a storage data SDAT in the hard disc 39. That is, it once again compresses the print request structure including the intermediate code data, and stores it in the hard disc 39. Since the intermediate code data is stored in a compressed form in the hard disc 39, the data size of the storage data SDAT is compact.

Further, after the print request managing task 61 completes storage of the storage data SDAT in the hard disc 39, it transmits a print end report PE2 to the memory managing task 62. The memory managing task 62 transmits a print end report PE3 to the language interpreting task 60 and released the memory area heretofore used by the language interpreting task 60.

Upon receipt of the print end report PE1 of the first copy, the print request managing task 61 personally issues a print request PREQS and transmits to itself. This print request PREQS is the print request for printing the second copy, et seq.

The process shown in FIG. 2 is conducted for each page of a single material to be printed from the first page to the final page.

Next explained is a process for printing the second copy, et seq. in case of collate printing with reference to FIG. 3.

As shown in FIG. 3, when printing of all pages of the first copy is finished, the print request managing task 61 borrows an area of memory from the memory managing task 62. Subsequently, the print request managing task 61 reads the storage data SDAT of one page from the hard disc 39, and using the borrowed memory area, it generates a print data PDAT of one page. That is, using SDAT read out from the hard disc 39, it creates the print data PDAT.

After that, the print request managing task 61 transmits the print data PDAT to the print execution task 63. Based on the print data PDAT, the print execution task 63 drives the printer engine 22 (see FIG. 1) and executes the printing, and upon completing the printing of the page, it transmits the print end report PE1 to the print request managing task 61.

In receipt of the print end report PE1, the print request managing task 61 returns the borrowed memory to the memory managing task 62 when printing of all copies is finished. If the number of copies already printed does not reach the requested number of copies, it again issue the print request PREQS to itself. By repeating such process, the print request managing task 61 completes collate printing of the requested number of copies.

In this embodiment, by configuring the print request managing task 61 to call out a storage module which stores data in the hard disk 39, storage data SDAT, etc. can be stored in the hard disc 39. Further, by configuring the print request managing task 61 to call out a read module which reads out data from the hard disc 39, storage data SDAT stored in the hard disc 39 can be read out. The "module" herein means a lump of program, and both tasks and objects are equally modules.

Figure 4:
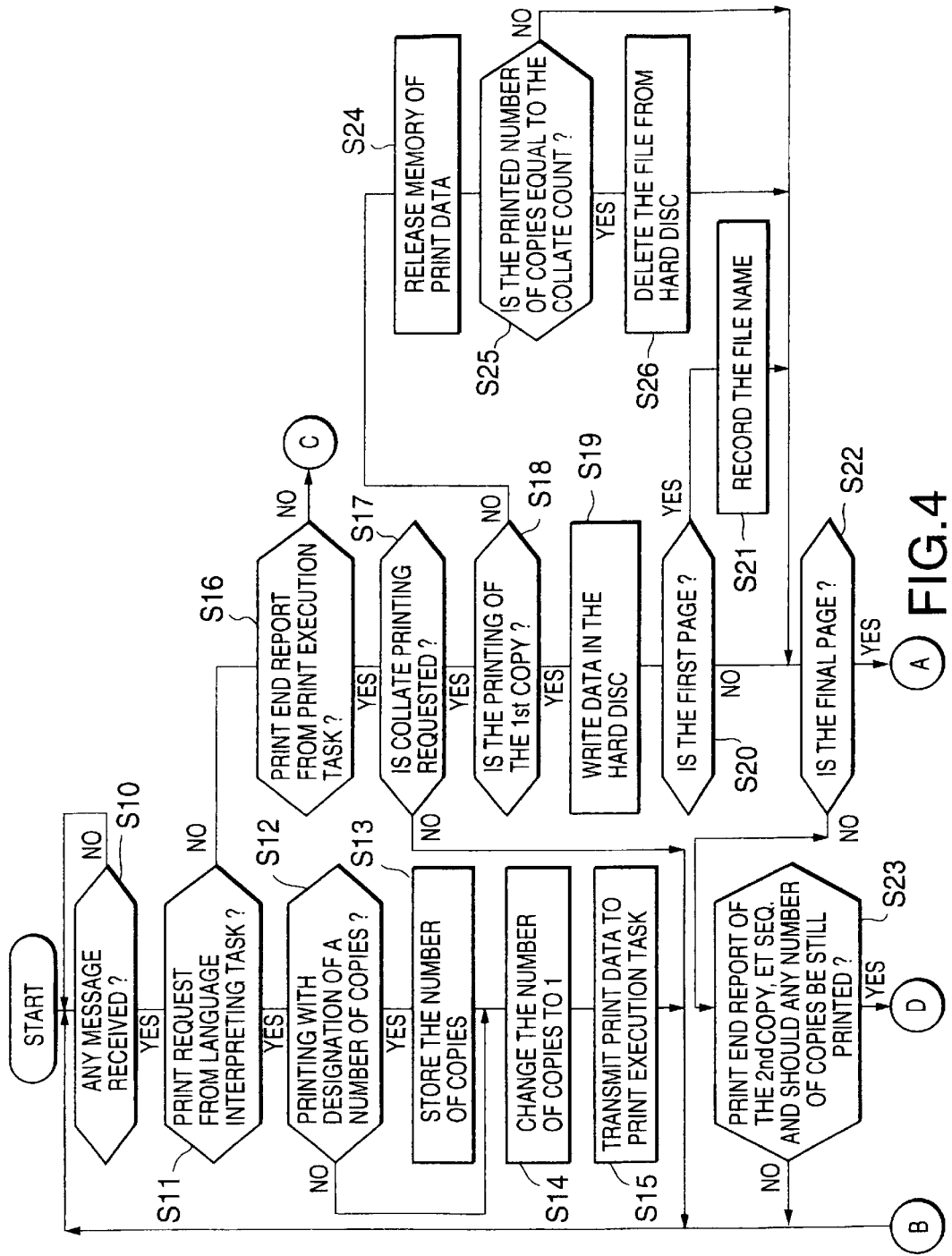
FIG. 4 is a diagram showing a flow chart for explaining the processing content of a print request managing task (No. 1)
Figure 5:
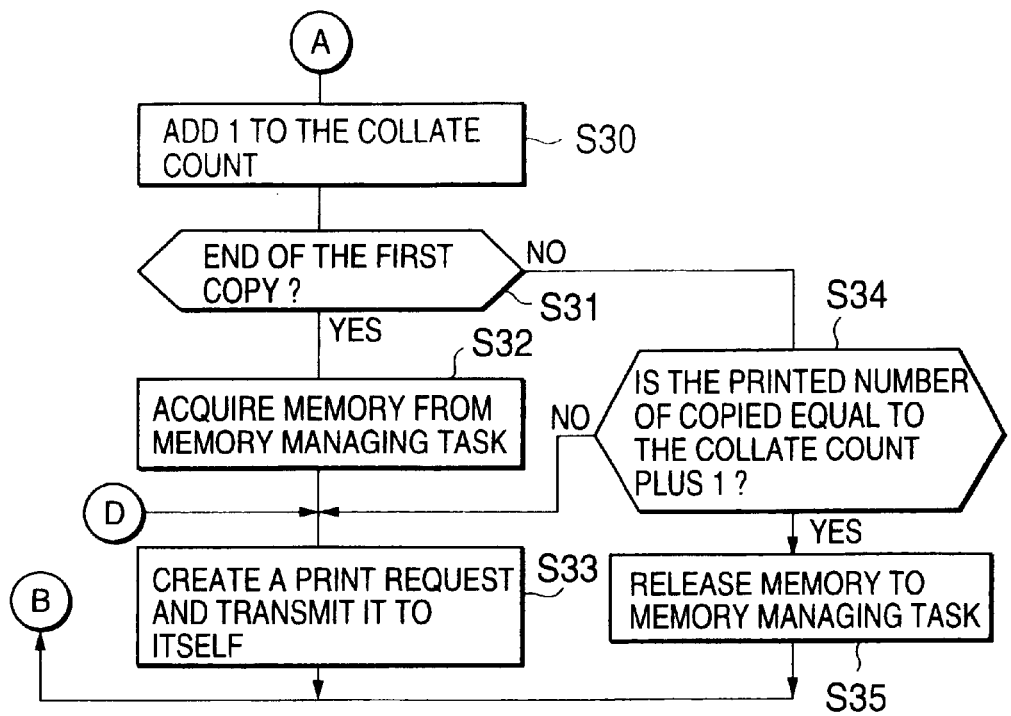
FIG. 5 is a diagram showing a flow chart for explaining the processing content of a print managing task (No. 2)
Figure 6:
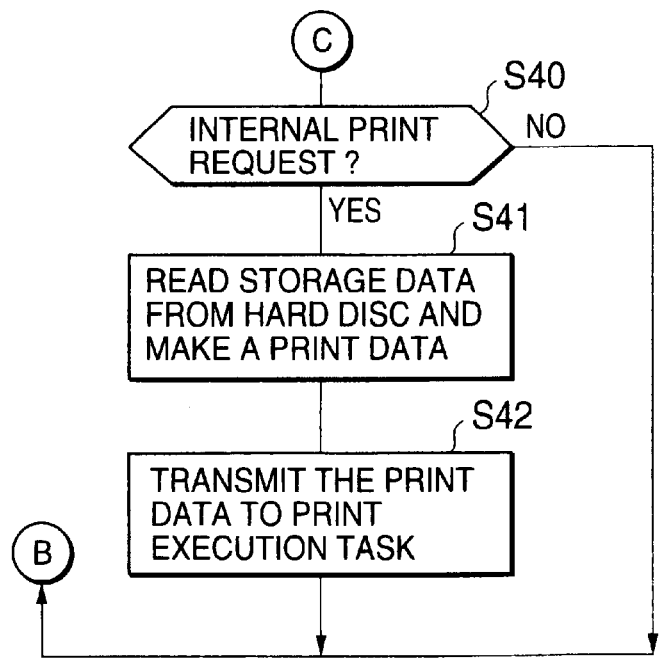
FIG. 6 is a diagram showing a flow chart for explaining the processing content of a print managing task (No. 3)

Next referring to FIGS. 4 through 6, the contents of processing by the print request managing task 61 is explained in detail. FIGS. 4 through 6 are flow charts which explain the contents of processing by the print request managing task.

First as shown in FIG. 4, the print request managing task 61 judges whether any massage has been received (step S10). When no message has been received, the process of this step S10 is repeated. That is, the print request managing task 61 is waiting until receiving a message. In this embodiment, massages are exchanged among tasks by page to page. That is,in case of a material of ten pages to be printed, ten print requests PREQ, ten pieces of print data PDAT, ten print end reports PE1 and ten pieces of storage data SDAT are generated.

When the print request managing task 61 receives a massage (step S10: Yes), it judges whether the message is a print request PREQ from the language interpreting task 60. If the message is a print request PREQ from the language interpreting task 60 (step S11: Yes), it further judges whether the print request PREQ is a print request designating a number of copies (step S12).

When it is a print request PREQ designating a number of copies of a certain material (step S12: Yes), it stores the number of copies to be printed (step S13). If it is not a print request PREQ indicating a number of copies (step S12: No), or when the number of copies is already stored in step S13, it changes the number of copies into 1 (step S14). Subsequently, it produces a print data PDAT based on the print request PREQ, and transmits to the print execution task 63 (step S15). Then, it repeats the process from step S10 explained above.

In step S11 mentioned above, if the received message is not a print request from the language interpreting task 60 (step S11: No), the print request managing task 61 judges whether the received message is the print end report PE1 from the print execution task 63 or not. If the message is the print end report PE1 from the print execution task 63 (step S16: Yes), the print request managing task 61 consecutively judges whether the printing is collate printing or not (step S17). I it is not collate printing (step S17: No), it repeats the process from step S10 explained above. That is, since collate printing is not requested, the process for printing is completed when printing one copy.

If the request is collate printing (step S17: Yes), the print request managing task 61 judges whether the printing is that of the first copy (step S18). If it is the printing of the first copy (step S18: Yes), it writes the data for the page as a storage data SDAT in the hard disc 39 (see FIG. 1) (step S19). In this embodiment, when data is written in the hard disc 39, the predetermined data is stored directly as a print request structure, and image data is stored in a compressed form.

The print request managing task 61 next judges whether the storage data SDAT stored in the hard disc 39 is the data of the first page of the material to be printed (step S20). If it is the data of the first page, the print request managing task 61 records the file name of the storage data SDAT (step S21).

When recording of the file name is finished, or when it judges that the data is not the data of the first page in step S20 (step S20: No), it judges whether the storage data SDAT stored in the hard disc 39 is the data of the final page or not (step S22). If it is not the storage data SDAT of the final page (step S22: No), it judges whether the received message is the print end report PE1 of the second copy, et seq. or not and any copy to be printed still remains or not (step S23). If the message is the print end report PE1 of the second copy, et seq., and there still remain any copy to be printed (step S22: Yes), the print request managing task 61 personally produces a print request PREQS in step S33, explained later, transmits it to itself (see FIG. 5), and thereafter returns to the process from step S10 already explained. In case that the received message is not the print end report PE1 of the second page, et seq., or no copy to be printed exists (step S22: No), it directly returns to the process from step S10 already explained.

As shown in FIG. 5, if the storage data SDAT is the data of the final page (step S22: Yes), 1 is added to the collate count (step S30). Subsequently, the print request managing task 61 judges whether the printing was the printing of the final page of the first copy or not (step S31).

If it was the printing of the final page of the first copy (step S31: Yes), it requests a memory to the memory managing task 62, and acquires a memory (step S32). Consecutively, the print request managing task 61 personally produces a print request PREQS and transmits it to itself. Then, it returns to the process from step S10.

In step S31, if it was not the printing of the final page (step S31: No), it judges whether the number of copies to be printed is equal to the value adding 1 to the collate count (step S34). If the number of copies to be printed is not equal to the value adding 1 to the collate count (step S34: No), it executes the process from step S33 already explained.

If the number of copies to be printed is equal to the value adding 1 to the collate count (step S34: Yes), it releases the memory area to the memory managing task 62 (step S35). Then, it repeats the process from step S10.

As shown in FIG. 4, if it judges in step S18 that the print end report PE1 received from the print execution task 63 is not the printing of the first copy (step S18: No), it released the memory heretofore storing the produced print data PDAT (step S24). Subsequently, it judges whether the number of copies to be printed and the collate count are equal or not (step S25).

When the number of copies to be printed and the collate count are not equal (step S25: No), the process from step S22 already explained is executed. When the number of copies to be printed and the collate count are equal (step S25: Yes), it deletes the file of the storage data SDAT of that page from the hard disc 39 (step S26). That is, when the final copy is being printed, every time upon finishing printing of every page, corresponding files are deleted by file to file from the hard disc 39. Then, the process from step S22 already explained is executed.

In step S16, if the received message is not the print end report PE1 from the print execution task 63 (step S16: No), as shown in FIG. 6, it judges whether it is an internal print request PREQS or not (step S40). That is, it judges whether it is the print request PREQS produced in step S 33 explained above.

If it is not the internal print request PREQS (step S40: No), it repeats the process from step S10. If it is the internal print request PREQS (step S40: Yes), the print request managing task 61 reads out the storage data SDAT of the corresponding page from the storage in the hard disc 39, and creates the print data PDAT (step S41). The print data PDAT made here is stored in the memory, and also transmitted to the print execution task 63 (step S42). Then, the process from S10 is repeated.

Figure 7:
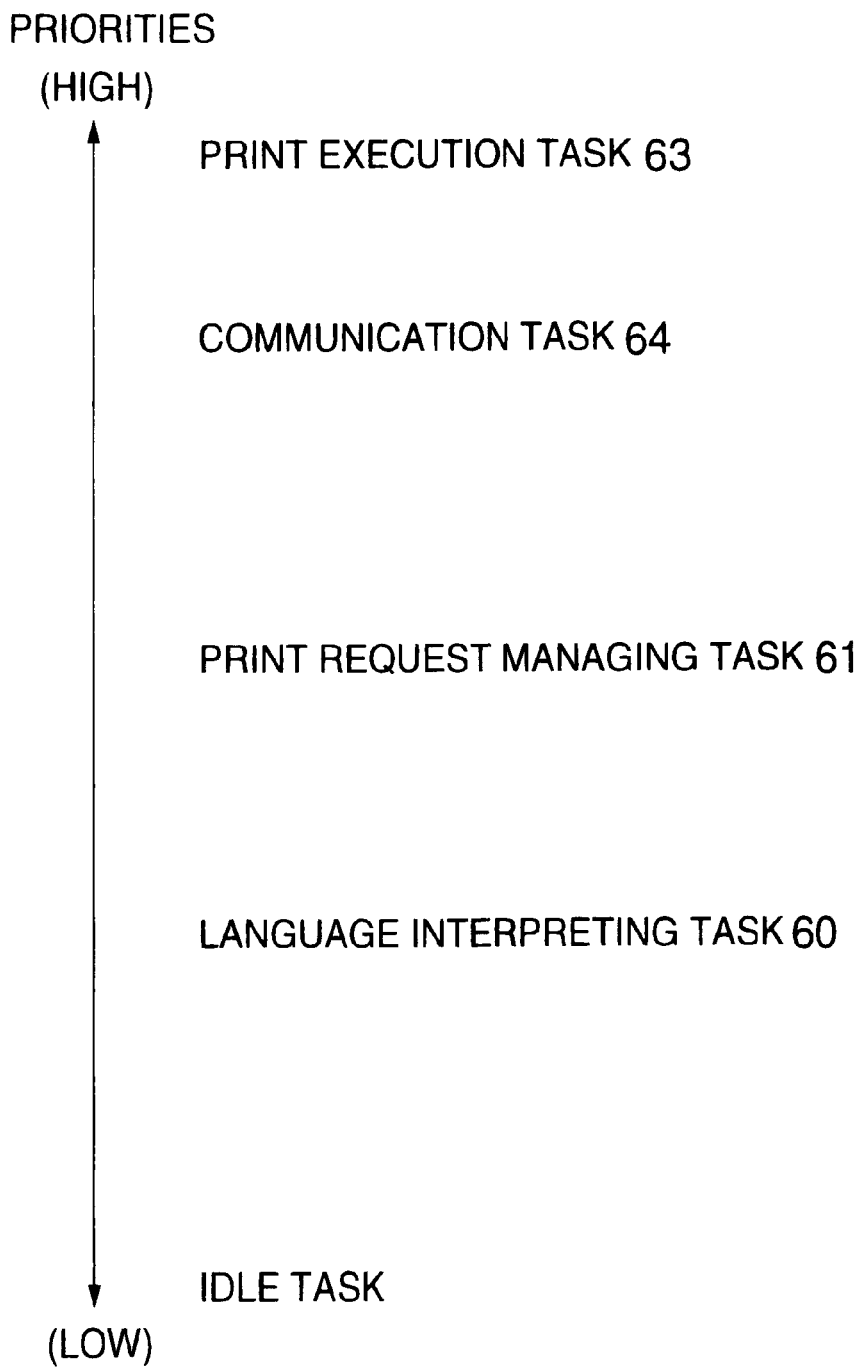
FIG. 7 is a diagram showing levels of priorities for allocation of CPU to individual tasks the printer according to the embodiment of the invention has.

FIG. 7 is a diagram showing an example of relative priorities of assignment of CPU 30 to individual tasks of the printer 10 according to the same embodiment. That is, FIG. 7 shows relative priorities among individual tasks in the laser print type page printer.

As shown in FIG. 7, the priority given to the print execution task 63 is the highest, then the priorities become lower in the order of the communication task 64, print request managing task 61 and language interpreting task 60, and the priority of the idle task is the lowest. That is, the priority given to the print request managing task 61 is lower than the communication task 64 and higher than the language interpreting task 60.

When data for printing arrives from the network 54, the communication task 64 is activated by CPU 30. the communication task 64 removes unnecessary data like IP address, for example, from the received data for printing, and extracts only data necessary for printing, and then transmits to the language interpreting task 60.

The reason why the priority of the print request managing task 61 is lower than the priority of the communication task 64 lies in that the data reception from the network 54 should be preferential to management of print requests PREQ. Further, the time required for the process by the print request managing task 61 is relatively long. Therefore, if the priority of the print request managing task is too high, it occurs that CPU 30 cannot be assigned to other tasks. Therefore, the print request managing task 61 has a lower priority than those of the print execution task 63 and the communication task 64.

The reason why the priority of the print request managing task 61 is higher than that of the language interpreting task 60 lies in preventing the language from being changed to a language of another printing during execution of the print request managing task 61. That is, there are various languages for printing. The language interpreting task 60 reads out a compressed program or compressed data necessary for interpreting a language of received data for printing from ROM 38, and once stores it in RAM 36. Then, it interprets data for printing, based on the program and data stored in RAM 36. Therefore, if a language changes to another during execution of the print request managing task 61, this language changing process is undesirably executed, and it results in taking much time for the printing process. To avoid it, the priority of the print request managing task 61 is set higher than the priority of the language interpreting task 60.

The reason why the priority of the print execution task 63 is the highest lies in that, if the printer engine 22 is operated intermittently in laser print type page printers, in general, a time loss occurs at every start-up. That is, operating the printer engine 22 continuously results in the most efficient printing process.

As explained above, since the printer according to the embodiment is so configured that, for collate printing of a plurality of copies, the print request PREQ of the first copy is directly used to make a printing data DAT without storing it in the hard disk 39, and delivered to the print execution task 63, the time required until completing the printing of the first copy can be decreased than conventional techniques. That is, conventional techniques were configured to first store data for printing in the hard disc 39 and then deliver a printing data to the print execution task prior to the printing of the first copy. However, this embodiment omits writing into the hard disc 39 upon printing the first copy, and can therefore reduce the time for completing the printing of the first copy shorter than the conventional techniques. Especially about the printing of the first page of the first copy of a material to be printed, since the time conventionally required for holding data in the hard disc can be removed, the printing can be completed very quickly.

When collate printing is not requested, that is, printing of only one copy is requested, since the printing is completed without holding the data for printing in the hard disc absolutely, the time required for completing the printing can be shortened significantly. That is, since the print request managing task 61 is placed at a latter stage of the language interpreting task 60, the print request managing task 61 can judge the contents of the material to be printed. Therefore, in the case where only one copy is printed, the print request managing task 61 need not hold the data in the hard disc 30, and it is sufficient to transmit the printing data PDAT to the print execution task 63. Therefore, the printing time can be shortened.

In addition, upon writing data for printing in the hard disc 39, the data is stored as storage data SDAT in a compressed form, and therefore, the data amount held in the hard disc 39 can be reduced.

Further, since the print request managing task 61 is configured to internally transmit a print request PREQS for each page upon completion of printing of each page of the first copy, this embodiment can be realized, minimizing influences to the other tasks.

Furthermore, since the priority assigning CPU 30 to the print request managing task 61 is lower than those of the print execution task 63 and the communication task 64, even under the existence of the print request managing task 61 which needs a longer processing time than other tasks, CPU 30 can be assigned adequately to other tasks. Additionally, since the priority assigning CPU 30 to the print request managing task 61 is higher than the language interpreting task 60, throughout the time in which CPU 30 is assigned to the print request managing task 61, the language interpreting task 60 never takes CPU 30 away.

Therefore, it is prevented that the language moves to different language interpretation during operation of the print request managing task 61.

The invention is not limited to the embodiment explained above, but various changes or modifications are possible. For example, as the above-mentioned tasks, a plurality of these tasks may be realized collectively, or a single task may be realized in a plurality of divisional parts. Furthermore, massages exchanged among individual tasks may be delivered or received for every two pages, for example, instead of every page.

Moreover, in the embodiment explained above, explanation was made as storing data for printing in the hard disc in a compressed form. However, its image data may be stored directly without compressing it. Also in this case, since the storage data SDAT is deleted from the hard disc 39 by page to page during printing of the final copy of the material to be printed every time when printing of each corresponding page is finished, the occupied region in the hard disc 39 can be released soon.

Further, regarding respective kinds of processing explained in the above embodiment, programs for executing the processing and priorities for such execution can be recorded in a recording medium such as floppy disc or CD-ROM (compact disc read only memory) and can be distributed in form of a recording medium. In this case, the embodiment can be realized by having the printer 10 read the recording medium storing the programs and their priorities and having the printer 10 execute the programs.

The printer 10 may be equipped with other programs such as an operation system or other application programs. In this case, efficiently using the own programs of the printer 10, only instructions for calling programs from the own programs of the printer, which realize processing equivalent to the processing of this embodiment, may be recorded on the recording medium.

These programs and their priorities can be distributed also as a carrier wave through a network, and not in form of a recording medium. Programs and their priorities transmitted in form of a carrier wave on the network can be taken into the printer 10, and when the programs are executed in the order of their programs to realize the above-explained embodiment.

When programs are recorded on a recording medium or transmitted as a carrier wave through a network, the programs and data on their priorities may have an encrypted and compressed form. In this case, the printer 10 having read in programs and data on their priorities from the recording medium or the carrier wave must decode or expand the data prior to execution.

As described above, according to the printer proposed by the invention, the print request managing task is placed between the language interpreting task and the print execution task, and the print request managing task is configured to manage: generating and transmitting print data based on a print request; storing data necessary for printing in accordance with the print request as a storage data in an auxiliary storage device; and generating and transmitting a print data from the storage data stored in the auxiliary storage device. Therefore, efficient collate printing can be realized.

What is claimed is:

1. A printer capable of printing by storing received data for printing in an auxiliary storage device and driving a printer engine, comprising:

a language interpreting task which interprets said data for printing and transmits a print request;

a print request managing task which receives said print request from said language interpreting task, and manages generation and transmission of print data based on said print request; and a print execution task which receives said print data from said print request managing task and drives said printer engine to execute printing according to the print data, wherein, when said print request requests collate printing of a plurality of copies for the first copy, said print request managing task generates print data in which the number of copies is changed to one, transmits the print data to said print execution task, and after receiving a print end report from said print execution task, stores data necessary for printing second and subsequent copies as storage data in said auxiliary storage device, and for the second and subsequent copies, said print request managing task reads out said storage data stored in said auxiliary storage device, and transmits print data generated in accordance with said storage data to said print execution task.

2. The printer according to claim 1 wherein a priority assigning said print request managing task to a central processing unit is higher than a priority assigning said language interpreting task to said central processing unit.

3. The printer according to claim 2 further comprising a communication task for managing receipt of said data for printing, a priority assigning said print request managing task to a central processing unit is lower than priorities assigning said print execution task or said communication task to said central processing unit.

4. The printer according to claim 1 wherein said print execution task transmits said print end report to said print request managing task when printing of said print data received from said print request managing task is finished.

5. The printer according to claim 4 wherein said print request managing task generates said storage data after compressing said print data, and then stores this storage data in said auxiliary storage device.

6. The printer according to claim 5 wherein, upon completion of printing respective copies, if the number of copies to be printed does not reach the requested number of copies to be printed, said print request managing task issues a print request and transmits it to itself.

7. The printer according to claim 6 wherein said print request managing task requests an area of memory necessary for printing the second and subsequent copies to a memory managing task, and acquires the area of memory.

8. The printer according to claim 7 wherein said language interpreting task issues said print request for each page, said print request managing task generates said print data and said storage data for each page, and said print execution task executes printing and transmits said print end report for each page.

9. The printer according to claim 8 wherein, every time upon completing printing of each page of the final copy, said storage data of corresponding pages stored in said auxiliary storage device is deleted sequentially and individually.

10. A printer capable of printing by storing received data for printing in an auxiliary storage device and driving a printer engine, comprising:

a language interpreting task which interprets said data for printing and transmits a print request;

a print request managing task which manages said print request received from said language interpreting task, and generates print data for executing printing with said printer engine in accordance with said print request; and a print execution task which receives said print data from said print request managing task and drives said printer engine to execute printing according to the print data, wherein when said print request requests collate printing of a plurality of copies, for the first copy, said print request managing task generates print data in which the number of copies is changed to one, transmits the print data to said print execution task, and after receiving a print end report from said print execution task, stores data necessary for printing second and subsequent copies as storage data in said auxiliary storage device, and for the second and subsequent copies, said print request managing task reads out said storage data stored in said auxiliary storage device, and transmits print data generated in accordance with said storage data to said print execution task, and said language interpreting task, said print request managing task and said print execution task are operative on a multi-task operating system which controls a plurality of tasks.

11. The printer according to claim 10 wherein said print request managing task determines depending on the number of copies to be printed whether said auxiliary storage device is used or not.

12. The printer according to claim 11 wherein said auxiliary storage device is used when said number of copies to be printed is not less than two.

13. The printer according to claim 12 wherein said print request managing task calls out a storage module for storing data in said auxiliary storage device when data is stored in said auxiliary storage device, and calls out a read module for reading out data from said auxiliary storage device when data is read out from storage of said auxiliary storage device.

14. A printer control method for controlling a printer capable of printing by storing received data for printing in an auxiliary storage device and driving a printer engine, comprising:

a language interpreting process which interprets said data for printing and transmits a print request;

a print request managing process which receives said print request, and manages, generation and transmission of print data based on said print request; and a print execution process which receives said print data and drives said printer engine to execute printing according to the print data, wherein when said print request requests collate printing of a plurality of copies, for the first copy, said print request managing task generates print data in which the number of copies is changed to one, transmits the print data to said print execution task, and after receiving a print end report from said print execution task, stores data necessary for printing the second and subsequent copies as storage data in said auxiliary storage device, and regarding the second and subsequent copies, said print request managing task reads out said storage data stored in said auxiliary storage device, and transmits print data generated in accordance with said storage data to said print execution task.

15. A recording medium storing a program for controlling a printer capable of printing by storing received data for printing in an auxiliary storage device and driving a printer engine, said program comprising:

a language interpreting step which interprets said data for printing and transmits a print request;

a print request managing step which receives said print request, and manages, generation and transmission of print data based on said print request; and a print execution step which receives said print data and drives said printer engine to execute printing according to the print data, wherein when said print request requests collate printing of a plurality of copies, for the first copy, said print request managing step generates print data in which the number of copies is changed to one, transmits the print data to said print execution step, and after receiving a print end report from said print execution step, stores data necessary for printing second and subsequent copies as storage data in said auxiliary storage device, and for the second and subsequent copies, said print request managing step reads out said storage data stored in said auxiliary storage device, and transmits print data generated in accordance with said storage data to said print execution step.

* * * * *